(12) United States Patent
Lamaire et al.

(10) Patent No.: US 10,398,152 B2
(45) Date of Patent: Sep. 3, 2019

(54) METHOD FOR PREPARING DEEP-FROZEN VEGETABLES PIECES

(71) Applicants: XINIR BVBA, Vleteren (BE); 24HOURNAMES.COM NV, Vleteren (BE); BRAMMIES BVBA, Alveringem (BE)

(72) Inventors: Bart Lamaire, Vleteren (BE); Jose Lamaire, Vleteren (BE); Bram Lamaire, Alveringem (BE)

(73) Assignees: XINIR BVBA, Vleteren (BE); 24HOURNAMES.COM NV, Vleteren (BE); BRAMMIES BVBA, Alveringem (BE)

( * ) Notice: Subject to any disclaimer, the term of this patent is extended or adjusted under 35 U.S.C. 154(b) by 0 days.

(21) Appl. No.: 14/897,954

(22) PCT Filed: Jun. 6, 2014

(86) PCT No.: PCT/BE2014/000027
§ 371 (c)(1),
(2) Date: Dec. 11, 2015

(87) PCT Pub. No.: WO2014/197950
PCT Pub. Date: Dec. 18, 2014

(65) Prior Publication Data
US 2016/0143303 A1    May 26, 2016

(30) Foreign Application Priority Data

Jun. 12, 2013 (BE) .................................. 2013/0415

(51) Int. Cl.
| | |
|---|---|
| *A23B 7/055* | (2006.01) |
| *A23L 1/216* | (2006.01) |
| *A23L 1/217* | (2006.01) |
| *A23L 19/12* | (2016.01) |
| *A23B 7/04* | (2006.01) |
| *A23B 7/06* | (2006.01) |
| *A23L 5/10* | (2016.01) |
| *A23L 19/18* | (2016.01) |

(52) U.S. Cl.
CPC ............ *A23B 7/055* (2013.01); *A23B 7/0408* (2013.01); *A23B 7/0416* (2013.01); *A23B 7/06* (2013.01); *A23L 5/11* (2016.08); *A23L 19/12* (2016.08); *A23L 19/14* (2016.08); *A23L 19/18* (2016.08); *A23V 2002/00* (2013.01)

(58) Field of Classification Search
CPC ............ A23B 7/055; A23B 7/06; A23L 19/18
See application file for complete search history.

(56) References Cited

U.S. PATENT DOCUMENTS

| | | | | |
|---|---|---|---|---|
| 2,813,796 A | * | 11/1957 | Keneaster | ............... A23L 7/196 426/444 |
| 3,136,642 A | * | 6/1964 | Backinger | ............... A23B 7/05 426/327 |
| 3,297,454 A | * | 1/1967 | Webster | ............... A23B 7/0408 426/524 |
| 3,553,973 A | * | 1/1971 | Moran | .................... A23L 3/361 62/380 |
| 3,729,323 A | | 4/1973 | Weaver et al. | |
| 4,579,743 A | | 4/1986 | Hullah | |
| 5,220,802 A | | 6/1993 | Kiczek et al. | |
| 5,244,674 A | * | 9/1993 | Cadas | ..................... A23L 19/14 426/509 |
| 5,606,861 A | * | 3/1997 | Renz | ...................... A23L 3/361 34/576 |
| 2003/0096046 A1 | * | 5/2003 | Asquith | .................. A23B 7/04 426/524 |
| 2006/0019003 A1 | * | 1/2006 | Take (Xulin Sun) | ... A23L 3/358 426/335 |

FOREIGN PATENT DOCUMENTS

| | | | |
|---|---|---|---|
| BE | 896864 A | * | 11/1983 |
| EP | 1785043 A1 | | 5/2007 |
| GB | 1273937 A | | 5/1972 |
| GB | 1279732 A | | 6/1972 |
| GB | 1409444 A | | 10/1975 |
| JP | 56134958 A | * | 10/1981 |
| JP | S56134958 | * | 10/1981 |
| JP | S56134958 A | | 10/1981 |
| WO | 9740708 A1 | | 11/1997 |
| WO | 2010044687 A1 | | 4/2010 |

OTHER PUBLICATIONS

Potter et al Food Science 5th Edition Chapman and Hall 1995, p. 188.*
All "All About Potatoes" recipetips.com Apr. 18, 2012 pp. 1-10 http://www.recipetips.com/kitchen-tips/t--826/all-about-potatoes.asp#contentReviews.*
Grausnnan "French-Fried Potatoes" Cookstr 1988 pp. 1-4 https://www.cookstr.com/recipes/french-fried-potatoes (Year: 1988).*

(Continued)

*Primary Examiner* — Kelly J Bekker
(74) *Attorney, Agent, or Firm* — Banner & Witcoff, Ltd.

(57) ABSTRACT

Method for preparing deep-frozen vegetable pieces, preferably potato pieces such as french fries, comprising of bringing the vegetable pieces into brief contact with an inert substance which has a temperature which is sufficiently low and for a period of time which is sufficiently long to impart to the outer layer of the vegetable pieces a temperature which is <0° C. while an inner part of the vegetable piece has a temperature which is >0° C.; slowly freezing the vegetable pieces until the pieces are fully deep-frozen by bringing the vegetable pieces into contact with air.

14 Claims, No Drawings

(56) References Cited

OTHER PUBLICATIONS

Oct. 10, 2014—(WO) International Search Report and Written Opinion—App PCT/BE2014/000027, pp. 1-8.
Feb. 23, 2017—(AU) First Office Action Appn 2014280859, pp. 1-9.

\* cited by examiner

METHOD FOR PREPARING DEEP-FROZEN VEGETABLES PIECES

The application is a U.S. National Phase Entry of International Application No. PCT/BE2014/000027 filed on Jun. 6, 2014, designating the United States of America and claiming priority to Belgium Patent Application No. 2013/00415 filed on Jun. 12, 2013. The present application claims priority to and the benefit of the above-identified applications and the above-identified applications are incorporated by reference herein in their entirety.

The present invention relates to deep-frozen vegetable pieces, preferably potato such as french fries, which are suitable for deep-frying, and a method for preparing the deep-frozen vegetable pieces, preferably potato.

Commercially marketed deep-frozen french fries are already pre-fried in a fat before being frozen and sold. The consumer then fries the deep-frozen french fries in a fat at a temperature between 150 and 225° C. or bakes them in an oven and thus obtains a fried pre-fried deep-frozen french fry. The pre-frying of french fries in fat is done in order to obtain french fries which taste good and have a crispy crust after being fried or deep-fried.

A drawback of the known fried pre-fried, deep-frozen french fries is that they are fried twice in a fat before the outer layer of the french fry is crisp. This results in the french fry absorbing a great deal of fat and having a high nutritional calorific value. In addition, the production cost of such a pre-fried, deep-frozen french fry is high because fat has to be heated to between 150° C. and 200° C. or higher before the pre-frying. Both the cost price of the oil and that of heating the deep-fryers result in high production costs.

U.S. Pat. No. 3,729,323 describes a process for preparing pre-fried, deep-frozen potato pieces. In a first step the potato pieces are brought into contact with a liquid refrigerant, for instance liquid nitrogen, by immersing the potato pieces in a bath of the refrigerant or by spraying the refrigerant onto the potato pieces. The contact time is limited such that only the surface layer of the pieces is frozen. Following the brief contact with the refrigerant, in a second step the potato pieces are immediately leached with warm water for a period of about 10 to 20 minutes. In a third step the potato pieces are pre-fried in oil for 0.5 to 3 minutes. In a fourth step the pre-fried potato pieces are subjected to a second freezing step for the purpose of obtaining frozen pre-fried potato pieces. Column 4 states that it is essential that there are two freezing steps separated by a pre-frying step.

GB 1 273 937 describes a method similar to the method of D1, wherein the leaching step is performed after the surface freezing step. Column 3 states that the potato pieces are fried in oil in conventional manner after leaching.

WO 2010/044687 describes a method for treating pieces of vegetable or fruit. The method consists of initial brief freezing with liquid nitrogen and subsequent freezing making use of a mist of an aqueous solution. The food products are UV-irradiated during or after the initial surface freezing. WO 2010/044687 does not use a leaching step and does not mention the quality of fried frozen vegetables.

It is therefore an object of the invention to provide a method for preparing deep-frozen vegetable pieces, preferably potato such as deep-frozen french fries, which comprise less fat and still make it possible to obtain a crispy crust.

Another object of the invention is to provide a method for preparing deep-frozen vegetable pieces, preferably potato such as deep-frozen french fries, for which the production cost is lower.

These and other objects are achieved with a method as according to claim 1. According to the method of claim 1 the potato pieces are thus not pre-fried, while U.S. Pat. No. 3,729,323 states that the pre-frying is an essential step. A deep-frozen vegetable piece without fat is not obtained in U.S. Pat. No. 3,729,323.

These objectives are more particularly achieved with a method for preparing deep-frozen vegetable pieces, preferably potato such as deep-frozen french fries. The vegetable pieces, preferably potato, are first leached or boiled. The vegetable pieces, preferably potato, are then optionally dried and optionally equalized. The vegetable pieces, preferably potato, can optionally also be pureed and/or formed into a shape. The vegetable pieces, preferably potato, are then briefly brought into contact with an inert substance which has a temperature which becomes sufficiently low and for a period of time which is sufficiently long to impart to the outer layer of the vegetable pieces, preferably potato, a temperature which is <0° C. and to impart to the inner part of the vegetable piece a temperature which is >0° C. The vegetable pieces, preferably potato, are then slowly frozen through until the pieces are fully deep-frozen.

The inventors have found, surprisingly, that after being fried in a fat a deep-frozen vegetable piece, such as a deep-frozen potato french fry, prepared according to the method of the invention, produces a fried french fry which has a crispy crust similar to a fried deep-frozen, pre-fried french fry. The inventors have further surprisingly found that the deep-frozen potato piece prepared according to the method of the invention comprises less fat after deep-frying than a piece of fried deep-frozen, pre-fried potato. A fried deep-frozen, pre-fried french fry typically has a fat content of about 25% by weight, while a fried deep-frozen french fry prepared according to the method of the invention can typically have for instance a fat content of about 15% by weight after deep-frying. The inventors have further established that, after frying, the inner part of the deep-frozen french fry prepared according to the invention has a soft structure inside which tastes of potato.

According to the invention a "deep-frozen vegetable piece" is understood to mean a vegetable piece, preferably a potato piece, which has been treated and frozen. The vegetable piece according to the invention is preferably a french fry. The french fry can take different forms. A typical shape of a french fry is beam-shaped with a width and thickness of about 7 mm to about 14 mm and with a random length which depends on the size of the potato used. The vegetable piece, such as potato, can also be pureed. The pureed vegetable piece, such as potato, can be formed into a specific shape, for instance of the "pommel duchesse" type. A "fried deep-frozen potato piece" is understood to mean a treated potato piece which has first been deep-frozen and subsequently fried or deep-fried in a fat.

A "deep-frozen, pre-fried potato piece" is understood to mean a potato piece which has first been pre-fried or deep-fried in a fat before being frozen.

A "fried deep-frozen, pre-fried potato piece" is understood to mean a deep-frozen, pre-fried potato piece which has been fried or deep-fried in a fat.

It is recommended that the step of the leached vegetable piece or boiled, pureed and shaped vegetable piece, preferably potato, coming into contact with the inert substance takes place rapidly or briefly. The vegetable piece is subjected to a so-called "flash freezing", wherein only an outer layer freezes very quickly while the inner part of the vegetable piece retains a temperature which remains above the freezing point. The flash freezing of the outer layer of the vegetable piece affects this layer and this layer undergoes a physical transformation which ensures that, when the vegetable piece is fried or deep-fried in a fat, the vegetable piece acquires a crispy crust while the inner part retains the structure of a soft cooked vegetable.

Without committing themselves to a theory, the inventors think that the flash freezing ensures that no large ice crystals are formed in the outer layer of the vegetable piece. The formation of large ice crystals, which occurs during slow freezing of a leached vegetable piece, would result, after defrosting and during frying, in the outer layer not being crispy but rather feeling limp The flash freezing however causes only small ice crystals to be formed, so that after defrosting and during frying the outer layer becomes crispy. According to another theory, the cells and/or parts of the cells in the outer layer of the vegetable piece are affected and exhibit freeze damage, which can cause the vegetable piece to acquire a crispy crust following frying or deep-frying.

"Outer layer" is understood to mean the layer of the vegetable piece, preferably potato, adjacent to the outer surface of the vegetable piece. In an embodiment the outer layer has a thickness of less than 2 mm, preferably less than 1 mm. "Equalized" is understood to mean a process in which a dried vegetable piece is allowed to rest so that the moisture in the vegetable piece can be redistributed and so that the moisture concentration is roughly uniform in the whole vegetable piece. Equalization typically takes place by allowing the vegetable to rest for 10 to 30 minutes at room temperature.

According to an embodiment of the invention, the temperature of the inert substance with which the vegetable piece is brought into contact lies between $-20°$ C. and $-200°$ C., preferably between $-25°$ C. and $-175°$ C., and more preferably between $-25°$ C. and $-120°$ C., and still more preferably between $-35°$ C. and $-80°$ C. A temperature which is even lower is typically undesirable. It would be difficult in practice to use very cold temperatures because the inner layer of the vegetable piece would then also soon freeze.

According to another embodiment according to the method, the contact time between the inert substance and the vegetable pieces, preferably potato, during the brief contact with the inert substance is no longer than 7 minutes, preferably between 10 seconds and 7 minutes, and still more preferably between 1 and 3 minutes. The contact time is preferably no longer than 7 minutes since the inner part of the vegetable piece would then otherwise also freeze during this step. The inner part must not freeze during this step so that the inner part retains a soft texture after frying or deep-frying.

The time and the temperature necessary to briefly freeze the vegetable piece depends on the type of vegetable being used, the size of the vegetable piece, the quantity of dry substance of the vegetable and the moisture in the vegetable.

In another embodiment the vegetable pieces, preferably potato, lie as far clear of each other as possible when being brought into brief contact with the inert substance so that the vegetable pieces, preferably potato, do not adhere to each other, or only do so as little as possible.

The vegetable pieces, preferably potato, are first leached before being brought briefly into contact with the inert substance. In an embodiment the leaching takes place in one or more steps. The leaching of a vegetable piece such as a potato for the purpose of preparing french fries is known in the prior art. The skilled person will appreciate that the leaching can take place in different ways depending on the type of vegetable and the size of the vegetable piece, such as at different temperatures or for different periods of time. According to an embodiment, the vegetable pieces, preferably potato, are leached to the point where the core, i.e. the inner part, has a temperature lying between $60°$ C. and $85°$ C., and preferably of about $70°$ C. Leaching typically takes place in steam and/or in water. The vegetable pieces, preferably potato, are cooked by the leaching.

In an embodiment the leaching takes place in water, salt water and/or water comprising a preservative.

Before the vegetable piece is brought briefly into contact with the inert substance, the vegetable piece can optionally be dried. In an embodiment the drying takes place by subjecting the vegetable pieces, preferably potato, to dry air with a temperature of about $60°$ C.-$80°$ C. for a determined period of time, for instance for 10 minutes. The choice of whether or not to perform this drying step depends on the type of vegetable, such as potato, and on the quantity of dry substance present in the vegetable. A potato with an underwater weight of about 360 g will typically be dried, while a potato with an underwater weight of 420 g is not dried, or is dried for a shorter period of time. "Underwater weight" is understood to mean the weight of 5 kg of potatoes (weighed in atmospheric conditions) under water. Potatoes with an underwater weight of 360 g have much less dry substance and have much more moisture than potatoes with a higher underwater weight. A skilled person knows when such a drying step is appropriate.

In an embodiment the potato piece has an underwater weight lying between 360 g and 450 g. Potatoes with a higher or lower underwater weight are less suitable for deep-frying and typically do not acquire a nicely crisp crust.

After the brief contact the vegetable pieces, preferably potato, are slowly frozen, preferably by placing the vegetable pieces, preferably potato, in an area of air. The air preferably has a temperature lying between $-5$ and $-50°$ C., preferably about $-20°$ C. The freezing typically takes place up to the point where the core of the vegetable piece has a temperature of about $-18°$ C. This is possible for instance by placing the vegetable pieces, preferably potato, in a freezing tunnel. The slow freezing preferably takes place for between 30 minutes and 180 minutes, preferably between 90 and 120 minutes. The slow freezing can take even longer. The temperature preferably falls by between $1°$ C./1.5 minutes and $1°$ C./12 minutes, preferably between $1°$ C./6 minutes and $1°$ C./10 minutes during the slow freezing. Most preferably the outer layer of the vegetable piece remains frozen after the brief contact with the inert substance.

In yet another embodiment the method has a step in which, before the pieces of vegetable, preferably potato, are briefly brought into contact with the inert substance, the pieces of vegetable, preferably potato, are first cooled to a temperature between 0 and $10°$ C., preferably between 1 and $5°$ C. and more preferably of about $2°$ C. This can be done by bringing the leached, optionally dried vegetable pieces, preferably potato, into contact with cold air or with cold water.

In another embodiment the inert substance used during the brief contact is selected from the group consisting of nitrogen, carbon dioxide or helium. Nitrogen is preferably used. The carbon dioxide can take a solid form or a gaseous form, and is preferably in gaseous form when it comes into contact with the vegetable piece. The nitrogen can take a liquid form or a gaseous form and is preferably in gaseous form when it comes into contact with the vegetable piece. The skilled person will appreciate that the physiological state of the inert substance depends on the temperature of the inert substance.

According to a specific preferred embodiment, the brief contact with the inert substance takes place by spraying the inert substance onto the vegetable pieces, preferably potato.

In yet another specific preferred embodiment bringing the vegetable pieces, preferably potato, into brief contact with the inert substance takes place by spraying liquid nitrogen in a space with a temperature of between −25° and −120° C., and preferably between −35° C. and −80° C., whereby the nitrogen comes into contact in gaseous form with the vegetable pieces, preferably potato.

In another embodiment bringing into contact of the vegetable pieces, preferably potato, takes place in a largely closed space.

In one aspect the invention relates to a vegetable piece obtainable with the above described method. In this aspect all technical effects and advantages of the different embodiments of the above described method apply mutatis mutandis for the vegetable pieces, preferably potato, obtainable according to the method of the invention.

In another aspect the invention relates to a frozen vegetable piece suitable for deep-frying, comprising an outer layer affected by flash freezing contact with an inert substance; an inner part which is cooked, and wherein the vegetable piece comprises no fat. After being deep-fried or fried in a fat, the vegetable piece has a crispy outer layer similar to a fried pre-fried, deep-frozen vegetable piece, such as potato. In this aspect all technical effects and advantages of the different embodiments of the above described method also apply mutatis mutandis for the frozen vegetable piece.

In an embodiment according to this aspect the outer layer of the vegetable piece is affected by flash freezing contact of the outer layer with a substance at a temperature lying between −20° C. and −200° C., preferably between −25° C. and −175° C. and more preferably between −25° C. and −120° C., and still more preferably between −35° C. and −80° C.

In an embodiment the inert substance is selected from the group consisting of nitrogen, helium, carbon dioxide, and is preferably nitrogen.

In another embodiment the duration of the flash freezing contact of the vegetable piece with the inert substance is no longer than 7 minutes and preferably between 10 seconds and 7 minutes, and still more preferably between 1 and 3 minutes.

In yet another embodiment the vegetable piece, immediately after the flash freezing contact with the substance, has an outer layer with a temperature lower than 0° C. and for instance about −2° C., and an inner part with a temperature higher than 0° C. and for instance +2° C.

In yet another embodiment the outer layer of the vegetable piece is less than 2 mm and preferably less than 1 mm.

"Flash freezing contact" is understood according to this invention to mean a contact of an inert substance with a vegetable piece, wherein only a part of the vegetable piece, in particular the outer layer, is briefly frozen. In other words, only a part of the vegetable acquires a temperature lower than 0° C. due to the flash freezing contact with an inert substance.

"Cooked" is understood according to this invention to mean that the vegetable is no longer raw and has undergone a physical change. This physical change is typically brought about by leaching the vegetable piece. A vegetable piece which is cooked may have been frozen slowly or not yet been frozen.

In an embodiment the vegetable piece is a potato with an underwater weight lying between 360 g and 450 g when potatoes which weigh 5 kg in atmospheric conditions are weighed under water.

In an embodiment the vegetable piece is frozen slowly and the potato piece has a temperature lying between 0 and −50° C., and preferably of about −18° C. The slow freezing preferably takes place for between 30 minutes and 180 minutes, preferably between 90 and 120 minutes. The slow freezing can take even longer. The temperature preferably falls during the slow freezing by between 1° C./1.5 minutes and 1° C./12 minutes, preferably between 1° C./6 minutes and 1° C./10 minutes. The outer layer of the vegetable piece most preferably remains frozen after coming into brief contact with the inert substance.

According to yet another aspect, the invention relates to the use of a vegetable piece prepared according to a method as described above or according to the above described aspect. All technical effects and advantages of the different embodiments of the above described method according to the invention also apply mutatis mutandis in this aspect.

The invention is further elucidated by the following non-limitative example, which represents an embodiment according to the invention.

EXAMPLES

Example 1

A potato with an underwater weight of 400 g is peeled and cut into french fries with a thickness and width of about 10 mm. The french fries are leached in salt water to the point where they have a core temperature of about 70° C. by being leached for 10 minutes in water of about 85° C.

The french fries are cooled to about 2° C. and then carried into an almost fully closed space on a conveyor belt. The french fries undergo a flash freezing in that gaseous nitrogen at a temperature of −80° C. is sprayed onto the french fries for 3 minutes.

The average temperature of the outer layer of the french fries is −2° C. and that of the core of the french fries amounts to +2° C.

The french fries are carried into a cooling chamber at a temperature of about −20° C.

The french fries are fried at 180° C. in vegetable oil. The french fries have a crispy crust and have a soft inner part which tastes of potato.

Example 2

The tables below show an overview of different tests which were performed. In table 1 french fries were steamed (leached) and dried. The core temperature of the french fry before the flash freezing is also shown. The temperature of the nitrogen is shown, as is the duration of the contact between the inert substance and the french fry. The temperature of the core of the french fry is then measured, as is that of the outer layer (edge). The french fries were then frozen slowly and deep-fried for about 5 minutes. The best results were achieved by the french fries which, after the flash freezing, had a temperature in the core of more than 0° C. and wherein the temperature of the outer layer is less than 0° C.

TABLE 1

| Test No. | Steamed | Dried | French fry temp Core, before freezing | Temperature of inert substance | Residence time | French fry temp, core, after freezing | Edge temp | Result after slow freezing and deep-frying |
|---|---|---|---|---|---|---|---|---|
| 7001 | Y | Y | 15.7 | −40 | 1 min 18 | 2 | 0 | Tasty |
| 7002 | Y | Y | 15.4 | −40 | 1 min 35 | −1 | −1 | Not very tasty |
| 7003 | Y | Y | 20 | −40 | 2 min 57 | −4 | −2 | Not very tasty |
| 7004 | Y | Y | 11.5 | −60 | 0.25 sec | 2 | −1 | Very tasty and crispy |
| 7005 | Y | Y | 10.8 | −60 | 0.39 sec | 1 | −1 | Very tasty and crispy outer layer |
| 7008 | Y | Y | 16 | −80 | 0.30 sec | 2 | −4 | Very tasty and crispy outer layer |
| 7009 | Y | Y | 23 | −80 | 1 min 38 | 0 | −6 | Tasty |
| 7010 | Y | Y | 18 | −80 | 2 min 48 | −2 | −6.5 | Not very tasty |
| 7012 | Y | Y | 10 | −80 | 0.45 sec | 2 | −2 | Very tasty and crispy outer layer |
| 7013 | Y | Y | 8 | −70 | 0.45 sec | 2 | −2 | Very tasty and crispy outer layer |
| 7014 | Y | Y | 34 | −70 | 1 min 45 | 0 | −4 | Tasty |
| 7015 | Y | Y | 14 | −50 | 3 min 36 | −2 | −6 | Not very tasty |

Table 2 shows the results of french fries which were first steamed (leached), then rinsed with lukewarm water. The temperature of the french fry before the flash freezing is measured. The temperature of the inert substance and the time for which the french fry comes into contact with the nitrogen are also shown. The temperature of the core of the french fry and of the edge of the french fry after the flash freezing are also shown. The french fries are then frozen slowly and deep-fried for about 4 to 5 minutes.

| Test No. | Steamed | Rinsed with water temperature | French Fry temp Core, before freezing | Temperature of inert substance | Residence time | French fry temp, core, after freezing | Edge temp | Result after slow freezing and deep-frying |
|---|---|---|---|---|---|---|---|---|
| 7016 | Y | 45° | 40 | −50 | 1 min 09 | 2 | 0 | Tasty |
| 7017 | Y | 38° | 32 | −50 | 1 min 48 | 0 | 0 | Not particularly tasty |
| 7018 | Y | 36° | 31 | −80 | 1 min 06 | 2 | 0 | Tasty |
| 7019 | Y | 34° | 22 | −80 | 1 min 14 | 0 | −2 | Not particularly tasty |
| 7020 | Y | 30° | 25 | −80 | 0.54 sec | −2 | −2 | Not very tasty |

The invention claimed is:

1. A method for preparing deep-frozen potatoes, comprising the steps of:
    leaching or boiling potato pieces;
    forming the potato pieces into a shape to obtain French fried shaped potatoes comprising an outer layer with a thickness of less than 1 mm and an inner part; said French fried shaped potatoes being beam shaped with a width and thickness of 7 mm to 14 mm;
    spraying an inert substance having a temperature lying between −20° C. and −200° C. onto the leached or boiled French fried shaped potatoes, for a period of time which is between 10 seconds and 7 minutes and sufficient to impart to only the outer layer of the French fried shaped potatoes a temperature which is <0° C. and which freezes the outer layer, while maintaining the inner part of the French fried shaped potatoes at a temperature which is >0° C.; and
    deep freezing the French fried shaped potatoes which have been sprayed with the inert substance by bringing the sprayed French fried shaped potatoes into contact with air until the French fried shaped potatoes are fully deep frozen, wherein said deep frozen French fried shaped potatoes are without fat and are suitable for deep-frying.

2. The method as claimed in claim 1, wherein the inert substance has a temperature lying between −25° C. and −175° C.

3. The method as claimed in claim 1, wherein the contact time between the inert substance and the French fried shaped potatoes is between 1 and 3 minutes and for a period of time sufficient to impart only the outer layer of the French fried shaped potatoes a temperature which is <0° C. and which freezes the outer layer, while maintaining the inner part of the French fried shaped potatoes at a temperature which is >0° C.

4. The method as claimed in claim 1, wherein the inert substance is selected from the group consisting of nitrogen, carbon dioxide and helium.

5. The method as claimed in claim 1, wherein before the spraying, the method further comprises a step of: cooling the leached or boiled potato pieces to a temperature of between 0 and 10° C.

6. The method as claimed in claim 1, wherein the inert substance is liquid nitrogen sprayed at a temperature lying between −25° and −175° C., and wherein the liquid nitrogen becomes gaseous at the moment of contact with the French fried shaped potato.

7. The method as claimed in claim 1, wherein the spraying takes place in a closed space.

8. The method as claimed in claim 1, comprising leaching of the potato pieces, wherein the leaching of the potato pieces takes place in one or more steps in water or steam until the core of the French fried shaped potatoes is between 60° C. and 85° C.

9. The method as claimed in claim 1, comprising leaching of the potato pieces, wherein the leaching of the potato pieces takes place in water, salt water and/or water comprising a preservative.

10. The method as claimed in claim 1, wherein the deep freezing of the sprayed French fried shaped potatoes takes place by placing the sprayed French fried shaped potatoes in a freezing tunnel with a temperature of between −15 and −50° C.

11. The method as claimed in claim 1, wherein during the deep freezing the temperature of the French fried shaped potatoes falls at a rate of between 1° C./1.5 minutes and 1° C./10 minutes.

12. A French fry obtainable with the method as claimed in claim 1.

13. The French fry as claimed in claim 12, wherein the French fry has an underwater weight lying between 360 g and 450 g when potatoes which weigh 5 kg in atmospheric conditions are weighed under water.

14. A method for preparing deep-fried French fries, comprising:
leaching or boiling potato pieces;
forming the potato pieces into a shape to obtain French fried shaped potatoes comprising an outer layer with a thickness of less than 1 mm and an inner part; said French fried shaped potatoes being beam shaped with a width and thickness of 7 mm to 14 mm;
spraying an inert substance having a temperature lying between −20° C. and −200° C. onto the leached or boiled French fried shaped potatoes, for a period of time which is between 10 seconds and 7 minutes and sufficient to impart to only the outer layer of the French fried shaped potatoes a temperature which is <0° C. and which freezes the outer layer, while maintaining the inner part of the French fried shaped potatoes at a temperature which is >0° C.;
deep freezing the French fried shaped potatoes which have been sprayed with the inert substance by bringing the sprayed French fried shaped potatoes into contact with air until the French fried shaped potatoes are fully deep frozen, wherein said deep frozen French fried shaped potatoes are without fat and are suitable for deep-frying; and
deep-frying the fully deep-frozen French fried shaped potatoes to form said deep-fried French fries.

* * * * *